(12) United States Patent
In et al.

(10) Patent No.: US 12,706,295 B2
(45) Date of Patent: Aug. 11, 2026

(54) ELECTRODE FOR RECHARGEABLE BATTERY, MANUFACTURING APPARATUS THEREOF AND MANUFACTURING METHOD THEREOF

(71) Applicant: SAMSUNG SDI CO., LTD., Yongin-Si (KR)

(72) Inventors: Jinhyuk In, Yongin-Si (KR); Soonsung Suh, Yongin-Si (KR); Junkyu Lee, Yongin-Si (KR); Uisong Do, Yongin-Si (KR); Hyeri Eom, Yongin-Si (KR); Dong Hun Lee, Yongin-Si (KR); Min-young Jeong, Yongin-Si (KR); Wonhyung Chae, Yongin-Si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 57 days.

(21) Appl. No.: 18/631,321

(22) Filed: Apr. 10, 2024

(65) Prior Publication Data

US 2025/0140777 A1 May 1, 2025

(30) Foreign Application Priority Data

Oct. 27, 2023 (KR) ........................ 10-2023-0145703

(51) Int. Cl.
*H01M 4/04* (2006.01)
*B05C 5/02* (2006.01)
*H01M 4/139* (2010.01)

(52) U.S. Cl.
CPC ......... *H01M 4/0404* (2013.01); *B05C 5/0258* (2013.01); *H01M 4/139* (2013.01)

(58) Field of Classification Search
None
See application file for complete search history.

(56) References Cited

U.S. PATENT DOCUMENTS

2001/0012588 A1* 8/2001 Kaido ................. H01M 4/0416 118/58
2007/0026312 A1* 2/2007 Imachi ................ H01M 4/1391 429/231.95
2010/0247792 A1* 9/2010 Emoto .................. B05C 5/0254 427/424
2016/0111708 A1* 4/2016 Miyamoto ............ B05C 5/0254 427/58
2018/0337396 A1 11/2018 Kim
2020/0295360 A1 9/2020 Bae et al.

(Continued)

FOREIGN PATENT DOCUMENTS

CN 116154140 A 5/2023
KR 10-1939327 B1 1/2019

(Continued)

*Primary Examiner* — Austin Murata
(74) *Attorney, Agent, or Firm* — Womble Bond Dickinson (US) LLP

(57) ABSTRACT

A method for manufacturing an electrode for a secondary battery, includes: ejecting, by an ejector, a first slurry and a second slurry at a variable ejection ratio that varies in response to control signals from a controller; coating, by a coater, the first slurry and the second slurry ejected at the variable ejection ratio onto a current collector in a longitudinal direction of the current collector; and drying, by a dryer, the first slurry and the second slurry coated onto the current collector.

11 Claims, 8 Drawing Sheets

(56) References Cited

U.S. PATENT DOCUMENTS

| | | | | |
|---|---|---|---|---|
| 2021/0119200 | A1* | 4/2021 | Nam | H01M 4/131 |
| 2022/0006064 | A1* | 1/2022 | Lee | B05C 11/1005 |
| 2023/0118343 | A1 | 4/2023 | Kang et al. | |

FOREIGN PATENT DOCUMENTS

| | | | |
|---|---|---|---|
| KR | 10-2380514 | B1 | 3/2022 |
| KR | 10-2023-0056220 | A | 4/2023 |

* cited by examiner

300

ELECTRODE FOR RECHARGEABLE BATTERY, MANUFACTURING APPARATUS THEREOF AND MANUFACTURING METHOD THEREOF

CROSS-REFERENCE TO RELATED APPLICATION

The present application claims priority to and the benefit of Korean Application No. 10-2023-0145703, filed on Oct. 27, 2023, in the Korean Intellectual Property Office, the entire disclosure of which is incorporated by reference herein.

BACKGROUND

1. Field

Aspects of embodiments of the present disclosure relate to a manufacturing apparatus, a manufacturing method, an electrode manufactured by the manufacturing method, and a secondary battery including the electrode.

2. Description of Related Art

Unlike primary batteries that are not designed to be (re) charged, secondary batteries (or rechargeable batteries) are batteries that are designed to be discharged and recharged. Low-capacity secondary batteries are used in portable, small electronic devices, such as smart phones, feature phones, notebook computers, digital cameras, and camcorders. Large-capacity secondary batteries are widely used as power sources for driving motors in hybrid vehicles and electric vehicles, and for storing power.

The secondary battery includes an electrode assembly including a positive electrode and a negative electrode, a case that houses the electrode assembly, and electrode terminals that connect to the electrode assembly.

The above information disclosed in this Background section is for enhancement of understanding of the background of the present disclosure, and therefore, it may contain information that does not constitute related (or prior) art.

SUMMARY

An electrode, such as a positive electrode or a negative electrode, may be formed by coating an active material slurry containing an active material, a binder, and the like on a surface of a current collector, and then drying the coated active material slurry. During the drying process of the active material slurry, the binder may migrate to an interface of the active material layer due to a binder migration, resulting in a decrease in the content of the binder in a region close to the current collector. As a result, the adhesion of the active material layer to the current collector may deteriorate, causing the active material layer to be separated from the current collector during a notching process or during charging and discharging of a cell.

As such, a large amount of a binder in the active material slurry may be included, but this may result in a higher binder concentration at the interface of the active material layer, which may increase an interfacial resistance. As a result, the diffusion of lithium ions into the electrode during fast charging may be limited, and lithium ions may precipitate on the surface of the electrode, which may cause cell degradation.

Embodiments of the present disclosure may be directed a manufacturing apparatus, a manufacturing method, an electrode manufactured by the manufacturing method, and a secondary battery including the electrode to achieve improved fast charging performance and/or enhanced interfacial adhesion.

According to one or more embodiments of the present disclosure, a method for manufacturing an electrode for a secondary battery, includes: ejecting, by an ejector, a first slurry and a second slurry at a variable ejection ratio that varies in response to control signals from a controller; coating, by a coater, the first slurry and the second slurry ejected at the variable ejection ratio onto a current collector in a longitudinal direction of the current collector; and drying, by a dryer, the first slurry and the second slurry coated onto the current collector.

In an embodiment, the ejector may include a first pump and a second pump, and to eject the first slurry and the second slurry, the method may further include: ejecting, by the first pump, the first slurry while rotating at a rotational speed that varies in response to control signals from the controller; and ejecting, by the second pump, the second slurry while rotating at a rotational speed that varies in response to control signals from the controller.

In an embodiment, the coater may include a dual-slot die including an upper slot and a lower slot, and to coat the first slurry and the second slurry, the method may further include: applying the first slurry onto the current collector through the lower slot of the dual-slot die; and applying the second slurry onto the current collector through the upper slot of the dual-slot die.

In an embodiment, the coater may include a slot die including a single slot, and to coat the first slurry and the second slurry, the method may further include applying the first slurry and the second slurry concurrently onto the current collector through the single slot of the slot die.

In an embodiment, thicknesses of the first slurry and the second slurry that are coated onto the current collector may vary along a longitudinal direction of the current collector, as the variable ejection ratio of the first slurry to the second slurry varies.

In an embodiment, in the ejecting of the first slurry and the second slurry, the variable ejection ratio of the first slurry to the second slurry may vary, while a sum of an ejection amount of the first slurry and an ejection amount of the second slurry may remain constant, in response to the control signals from the controller.

In an embodiment, in the ejecting of the first slurry and the second slurry, the variable ejection ratio of the first slurry to the second slurry over time or over a coating length may vary in a wave-like manner in response to the control signals from the controller.

In an embodiment, in the ejecting of the first slurry and the second slurry, each of a rotational speed of the first pump and a rotational speed of the second pump over time or over a coating length may vary in a wave-like manner in response to the control signals from the controller.

In an embodiment, in the ejecting of the first slurry and the second slurry, each of the rotational speed of the first pump and the rotational speed of the second pump over the time or over the coating length may vary in a range from +20% to +80% based on a central value of the rotational speed.

In an embodiment, to coat the first slurry and the second slurry, the method may include: coating the first slurry on a top surface of the current collector; and coating the second slurry on a top surface of the first slurry.

In an embodiment, a binder content of the first slurry may be higher than a binder content of the second slurry.

In an embodiment, the method may further include feeding, by a backup roll, the current collector to the coater.

In an embodiment, the electrode for a secondary battery may be provided as manufactured by the method.

According to one or more embodiments of the present disclosure, an apparatus for manufacturing an electrode for a secondary battery, includes: an ejector configured to eject a first slurry and a second slurry; a controller configured to control the ejector so that a variable ejection ratio of the first slurry to the second slurry is varied; and a coater configured to coat the first slurry and the second slurry ejected from the ejector at the variable ejection ratio onto a current collector in a longitudinal direction of the current collector.

In an embodiment, the ejector may include: a first pump configured to eject the first slurry while rotating at a rotational speed that varies in response to control signals from the controller; and a second pump configured to eject the second slurry while rotating at a rotational speed that varies in response to control signals from the controller.

In an embodiment, the coater may include a dual-slot die including an upper slot and a lower slot, the lower slot may be configured to apply the first slurry onto the current collector, and the upper slot may be configured to apply the second slurry onto the current collector.

In an embodiment, the coater may include a slot die including a single slot, and the single slot may be configured to concurrently apply the first slurry and the second slurry onto the current collector.

In an embodiment, the controller may be configured to control the variable ejection ratio of the first slurry to the second slurry to vary, while a sum of an ejection amount of the first slurry and an ejection amount of the second slurry remains constant.

In an embodiment, the controller may be configured to control the variable ejection ratio of the first slurry to the second slurry over time or over a coating length to vary in a wave-like manner.

In an embodiment, the controller may be configured to control each of the rotational speed of the first pump and the rotational speed of the second pump over time or over a coating length to vary in a wave-like manner.

According to some embodiments of the present disclosure, the regions with a relatively high binder content and the regions with a relatively low binder content may be alternately formed along a coating length direction. As a result, enhanced interfacial adhesion and improved fast charging performance may be concurrently achieved.

According to some embodiments of the present disclosure, it may be possible to manufacture an electrode that concurrently achieves improved interfacial adhesion and fast charging performance using typical dual coating equipment, without the need for additional equipment.

1 However, the aspects and features of the present disclosure are not limited to those above, and the above and other aspects and features of the present disclosure, will be clearly understood by those having ordinary skill in the art from the detailed description of the present disclosure with reference to the drawings.

BRIEF DESCRIPTION OF DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
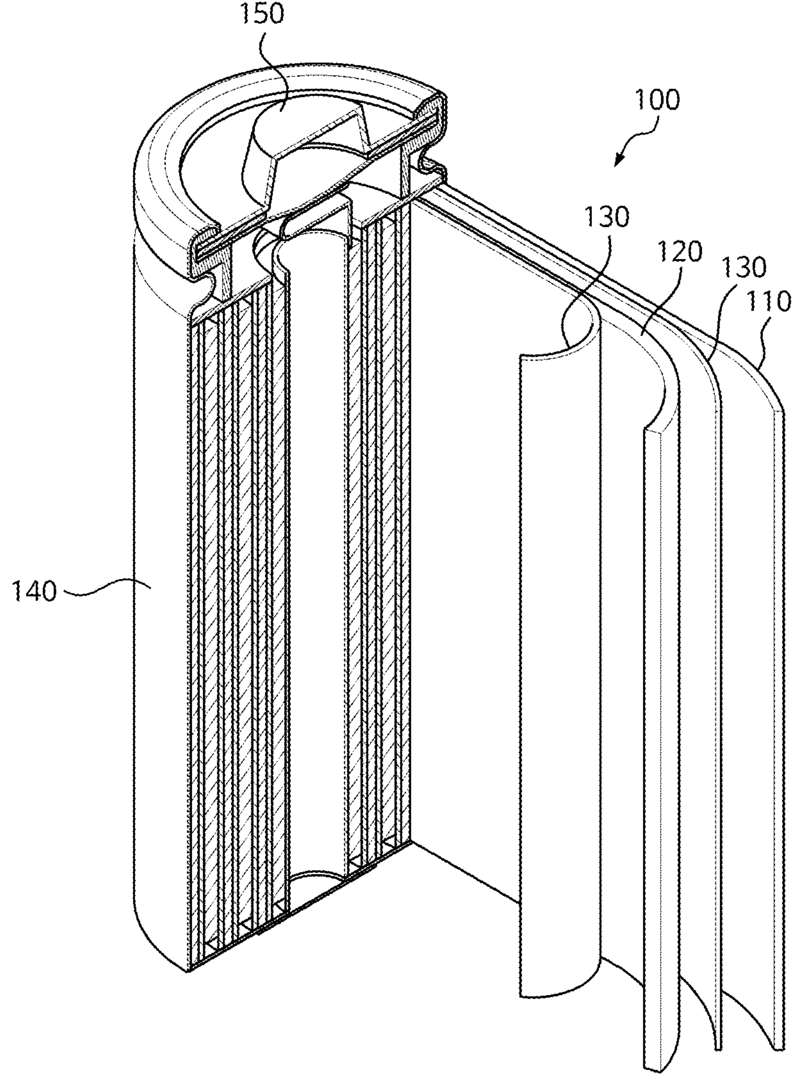
FIG. 1 is a diagram illustrating an example of a secondary battery according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

Any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein.

References to two compared elements, features, and the like as being "the same" may mean that they are "substantially the same". Thus, the phrase "substantially the same" may include a case having a deviation that is considered low in the art, for example, a deviation of 5% or less. In addition, when a certain parameter is referred to as being uniform in a given region, it may mean that it is uniform in terms of an average.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, cylindrical cells may be described as a representative example to which the methods and systems for manufacturing the electrodes for the secondary batteries are employed. However, the present disclosure is not limited thereto, and any one of a prismatic/pouch/cylindrical batteries may be applied, and the applied batteries may have the same or substantially the same general structure as those of the cylindrical cells described in more detail hereinafter. For generally applicable technologies, the general structure of a prismatic/pouch/cylindrical batteries is described, but the present disclosure is not limited to these kinds of batteries.

FIG. 1 is a diagram illustrating an example of a secondary battery 100 according to an embodiment of the present disclosure.

Referring to FIG. 1, in an embodiment, the secondary battery 100 may include an electrode assembly, a case 140 to accommodate the electrode assembly and an electrolyte therein, and a cap assembly 150 that is connected to (e.g., coupled to or attached to) an opening of the case 140 to seal the opening of the case 140.

The electrode assembly may include a first electrode 120, a second electrode 110, and a separator 130 disposed between the first electrode 120 and the second electrode 110. The electrode assembly may be wound, folded, or stacked to be accommodated in the case 140. FIG. 1 illustrates a structure of the case 140 having a cylindrical shape, but the present disclosure is not limited thereto. For example, the case 140 of the secondary battery 100 may have any suitable shape, such as a cylindrical shape, a rectangular shape, a pouch shape, or a circular shape.

The first electrode 120 may include a first current collector, and a first active material layer formed on the first current collector. A first tab may extend outward from a first uncoated region of the first current collector where the first active material layer is not formed, and the first tab may be electrically connected to (e.g., electrically coupled to) the cap assembly 150 or the case 140.

The second electrode 110 may include a second current collector, and a second active material layer formed on the second current collector. A second tab may extend outward from a second uncoated region of the second current collector where the second active material layer is not formed, and the second tab may be electrically connected to (e.g., electrically coupled to) the case 140 or the cap assembly 150. In an embodiment, the first tab and the second tab may be formed to extend in opposite directions as each other.

The first electrode 120 may serve as a positive electrode. In this case, the first current collector may be formed of, for example, an aluminum foil, and the first active material layer may include, for example, a transition metal oxide. The second electrode 110 may serve as a negative electrode. In this case, the second current collector may be formed of, for example, a copper foil or a nickel foil, and the second active material layer may include, for example, graphite.

In an embodiment, a plurality of secondary batteries 100 may be stacked to form a battery pack. The battery pack may be utilized in any suitable device that desires high capacity and high output, such as a laptop, a smartphone, an electric vehicle, and/or the like.

The secondary battery 100 may be a lithium secondary battery, a sodium secondary battery, or the like. However, the present disclosure is not limited thereto, and the secondary battery 100 may include any suitable kind of battery capable of repeatedly providing electrical power through charging and discharging operations. In an embodiment, in a case where the secondary battery 100 is a lithium secondary battery, the secondary battery 100 may be used in an electric vehicle (EV), because it may have excellent life cycle and high rate performance. For example, the lithium secondary battery may be used in a hybrid vehicle, such as a plug-in hybrid electric vehicle (PHEV). The lithium secondary battery may be used in applications that desire large amounts of power storage. For example, the lithium secondary battery may be used in an electric bicycle, a power tool, and/or other similar applications.

Figure 2:
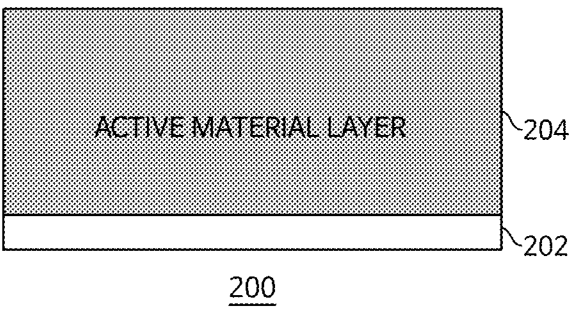
FIG. 2 is a diagram illustrating an example of an electrode according to an embodiment of the present disclosure.
Figure 2:
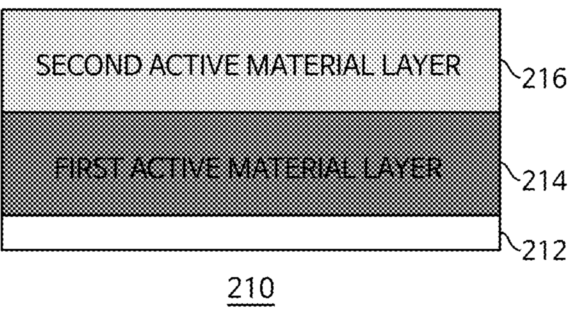
Figure 2:
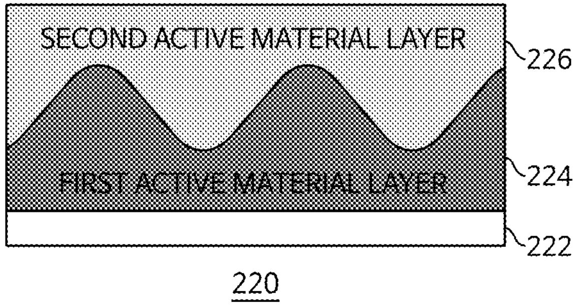

FIG. 2 is a diagram illustrating an example of the electrode according to an embodiment of the present disclosure.

Referring to FIG. 2, a first example 200 illustrates a cross-sectional view of an electrode according to a first comparative case. In the first comparative case, a single active material layer 204 may be formed on a current collector 202. The active material layer 204 may include an active material and a binder.

In the case of the electrode having the single active material layer 204, during a drying process of an active material slurry, the binder may move to the interface of the active material layer due to a binder migration, and the content of the binder may decrease in a region adjacent to the current collector 202. As a result, the adhesion between the current collector 202 and the active material layer 204 may deteriorate, which may cause the active material layer 204 to be separated from the current collector 202 during a notching process or charging and discharging processes of the cell.

As such, a large amount of a binder in the active material slurry may be included. However, in this case, the concentration of the binder at the interface of the active material layer 204 increases, which may lead to the increase of an interfacial resistance. The increase of the interfacial resistance may limit the diffusion of lithium ions into the electrode during fast charging, which may lead to the precipitation of lithium ions onto the surface of the electrode, causing cell degradation.

Therefore, in the electrode of the first example 200 including the single active material layer 204, it may be desired to decrease the content of the binder for improvement of the fast charging performance, but also, to increase the content of the binder for enhancement of the adhesion with the current collector 202. Therefore, it may be difficult for the first example 200 to concurrently achieve improvement of the fast charging performance and enhancement of the adhesion.

A second example 210 in FIG. 2 illustrates a cross-sectional view of an electrode according to a second comparative case. In the second comparative case, two active material layers 214 and 216 may be formed on a current collector 212. For example, as shown in the second example 210 of FIG. 2, the first active material layer 214 (e.g., a lower active material layer) may be formed on the current collector 212, and the second active material layer (e.g., an upper active material layer) 216 may be formed on the first active material layer 214. Here, the content of the binder of the first active material layer 214 may be higher than the content of the binder of the second active material layer 216. In other words, a sufficient amount of the binder may be included in the first active material layer 214 that is adjacent to the current collector 212 to increase the adhesion between the current collector 212 and the first active material layer 214, while the content of the binder in the second active material layer 216 may be decreased to inhibit an increase of the interfacial resistance. As a result, the enhanced adhesion with the current collector 212 may be achieved, while concurrently forming pathways for the diffusion of lithium ions into the electrode.

However, with the recent frequent use of large cells with very high energy density, even in the case of the electrode in the second example 210 including the two active material layers 214 and 216, there may be a limitation for the diffusion of lithium ions into the electrode during fast charging.

A third example 220 in FIG. 2 illustrates a cross-sectional view of an electrode according to an embodiment of the present disclosure. In an embodiment of the present disclosure, two active material layers 224 and 226 may be formed on a current collector 222, and a thickness of each of the two active material layers 224 and 226 may vary along a longitudinal direction of the current collector 222. For example, as shown in the third example 220 of FIG. 2, the first active material layer 224 with a relatively higher binder content may be formed on the current collector 222, and the second active material layer 226 with a relatively lower binder content may be formed on the first active material layer 224. Further, a total thickness of the first and the second active material layers 224 and 226 may be constant or substantially constant, while a ratio of the thickness of the first active material layer 224 to the thickness of the second active material layer 226 may vary along the longitudinal direction of the current collector 222. As an example, regions with a higher proportion of the first active material layer 224 and regions with a higher proportion of the second active material layer 226 may be formed alternately with each other along the longitudinal direction of the current collector 222. The region with the higher proportion of the first active material layer 224, which has a relatively higher binder content, may enhance the interfacial adhesion, and the region with the higher proportion of the second active material layer 226, which has a relatively lower binder content, may facilitate the penetration of lithium ions and improve the fast charging performance.

Figure 3:
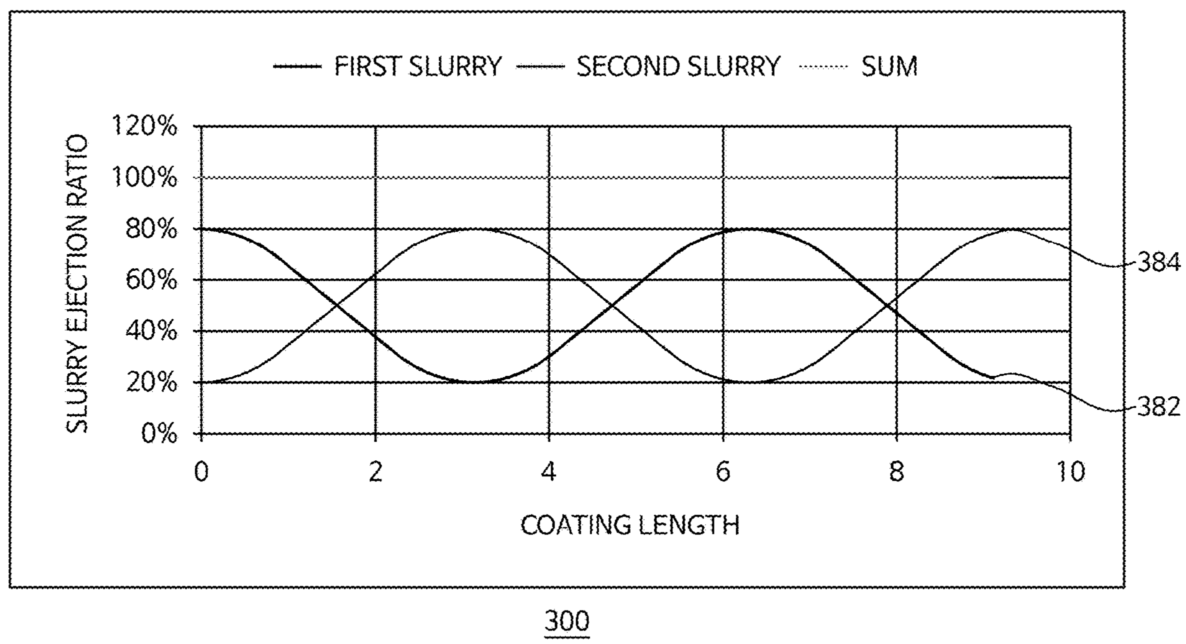
FIG. 3 is a graph illustrating an example of a slurry ejection ratio according to an embodiment of the present disclosure.

FIG. 3 is a graph illustrating an example of a slurry ejection ratio according to an embodiment of the present disclosure.

In an embodiment, by varying the ejection ratio of a first slurry to a second slurry over time or a coating length, an electrode manufacturing apparatus may manufacture an electrode in which the thickness of each of the active material layers varies along the longitudinal direction of the current collector.

For example, as shown in an ejection ratio graph 300 of FIG. 3, the electrode manufacturing apparatus may vary an ejection proportion 382 of the first slurry and an ejection proportion 384 of the second slurry, while maintaining a constant or substantially constant sum of an ejection amount of the first slurry and an ejection amount of the second slurry. In this case, as the ejection proportion 382 of the first slurry increases, the ejection proportion 384 of the second slurry may be decreased by the same amount (e.g., by the increased amount of the ejection proportion 382 of the first slurry). Similarly, as the ejection proportion 382 of the first slurry decreases, the ejection proportion 384 of the second slurry may be increased by the same amount (e.g., by the decreased amount of the ejection proportion 382 of the first slurry).

In more detail, as shown in the ejection ratio graph 300 of FIG. 3, the electrode manufacturing apparatus may control the ejection ratio, such that the ejection proportion 382 of the first slurry and the ejection proportion 384 of the second slurry vary in a wave-like manner along the coating length. Accordingly, the thickness of the applied first slurry and the thickness of the applied second slurry may vary in a wave-like manner along the longitudinal direction of the collector plate. As such, the electrode in which the interface between the two active material layers has a wave or substantially wave shape along the longitudinal direction of the current collector may be manufactured.

Figure 4:
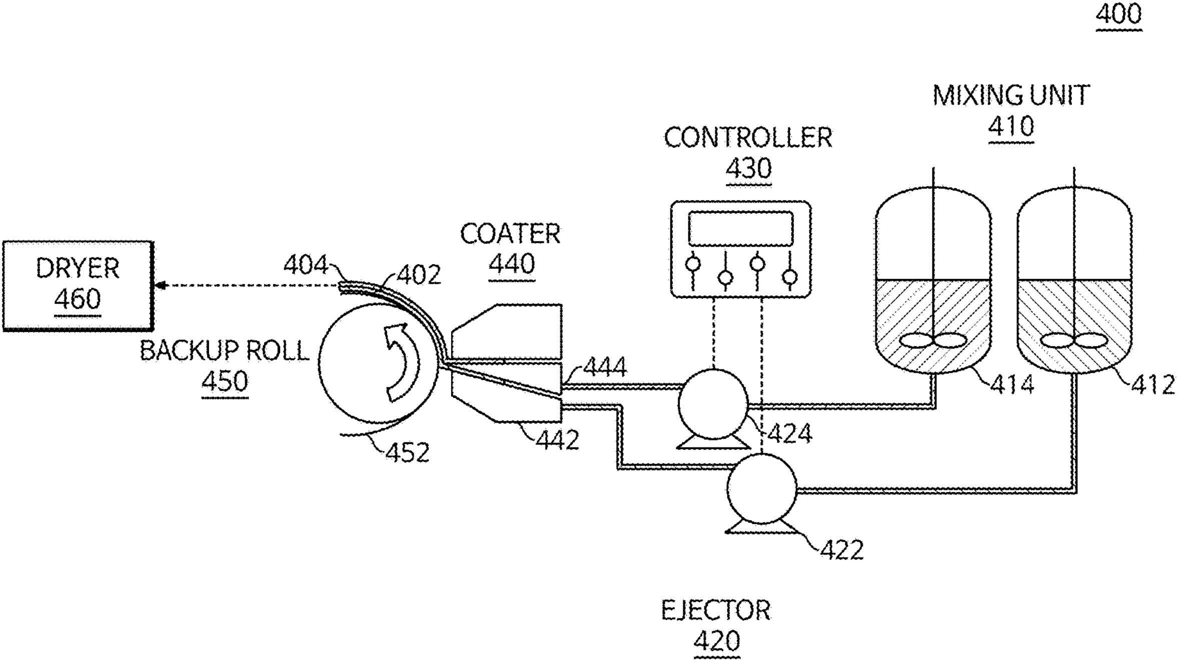
FIG. 4 is a schematic diagram illustrating an example of an electrode manufacturing apparatus according to an embodiment of the present disclosure.

FIG. 4 is a schematic diagram illustrating an example of an electrode manufacturing apparatus 400 according to an embodiment of the present disclosure.

According to one or more embodiments of the present disclosure, by using the electrode manufacturing apparatus 400, it may be possible to manufacture an electrode in which the thickness of each active material layer varies along the longitudinal direction of the current collector. Referring to FIG. 4, the electrode manufacturing apparatus 400 according to an embodiment may include a mixing unit (e.g., a mixer or a mixing device) 410, an ejector 420, a controller 430, a coater 440, a backup roll 450, and a dryer 460.

The mixing unit 410 may mix the first slurry and the second slurry. For example, the mixing unit 410 may include a first mixer 412 and a second mixer 414. The first mixer 412 and the second mixer 414 may mix the first slurry and the second slurry, respectively.

The first slurry may include a first active material and a first binder, and the second slurry may include a second active material and a second binder. The binder content of the first slurry may be higher than the binder content of the second slurry.

In an embodiment, the first active material included in the first slurry and the second active material included in the second slurry may be the same as each other or different from each other. For example, the first active material and the second active material may be the same as each other. In case of using the same active material as each other, a reduced amount of the binder may be used compared to a case where a single active material layer is used. As another example, the first active material and the second active material may be different from each other. In case of using of the different active materials from each other, the advantages of the respective active materials can be combined and used. Similarly, the first binder and the second binder may be the same as each other or different from each other.

Each of the first slurry and the second slurry mixed by the mixing unit 410 may be provided to the ejector 420.

The ejector 420 may eject the mixed first slurry and the mixed second slurry. The ejector 420 may eject the first slurry and the second slurry at the ejection ratio that varies in response to control signals from the controller 430. For example, the controller 430 may control the ejector 420, such that the ejection ratio of the first slurry to the second slurry varies, while the sum of the ejection amount of the first slurry and the ejection amount of the second slurry remains constant or substantially constant. Then, the ejector 420 may eject the first slurry and the second slurry in response to the control signals from the controller 430, while maintaining or substantially maintaining a constant sum of the ejection amount of the first slurry and the ejection amount of the second slurry, and allowing the ejection ratio of the first slurry to the second slurry to be varied.

In more detail, the controller 430 may control the ejector 420 so that each of the ejection proportion of the first slurry and the ejection proportion of the second slurry over time or the coating length varies in a wave-like manner (e.g., the ejection ratio of the first slurry to the second slurry over time or the coating length varies in a wave-like manner). In response to control signals from the controller 430, the ejector 420 may eject the first slurry and the second slurry so that each of the ejection proportion of the first slurry and the ejection proportion of the second slurry over time or the coating length varies in a wave-like manner.

In an embodiment, the ejector 420 may include a first pump 422 and a second pump 424. In this case, the first pump 422 may rotate at a rotational speed that varies in response to control signals from the controller 430, and may eject the first slurry mixed by the first mixer 412. Further, the second pump 424 may rotate at a rotational speed that varies in response to control signals from the controller 430, and may eject the second slurry mixed by the second mixer 414. For example, the rotational speed of each of the first pump 422 and the second pump 424 over time or the coating length may vary in a wave-like manner.

In more detail, the controller 430 may control the first pump 422 and the second pump 424 so that the rotational speed of each of the first pump 422 and the second pump 424 over time or along the coating length fluctuates in a wave-like manner in a range from +20% to #80% on the basis of a central value of the rotational speed. In response to control signals from the controller 430, the elapsed time-based rotational speed or the coating length-based rotational speed of each of the first pump 422 and the second pump 424 may vary in a wave-like manner in the range from +20% to +80% with respect to the central value of the rotational speed.

The first slurry and the second slurry ejected from the ejector 420 may be injected into the coater 440.

The coater 440 may apply the first slurry 402 and the second slurry 404 ejected at a variable ejection ratio onto the current collector 452 in the longitudinal direction of the current collector 452. For example, the backup roll 450 may rotate and feed the current collector 452 to the coater 440, such that the current collector 452 passes through the coater 440 in the longitudinal direction thereof. The coater 440 may apply the first slurry 402 and the second slurry 404 onto the current collector 452 fed by the backup roll 450 in the longitudinal direction of the current collector 452. In the coating process, the first slurry 402 may be coated on a top surface of the current collector 452, and the second slurry 404 may be coated on a top surface of the first slurry 402.

In an embodiment, the coater 440 may include a dual-slot die including an upper slot 444 and a lower slot 442. In this case, the first slurry 402 may be applied through the lower slot 442 of the dual-slot die, and the second slurry 404 may be applied through the upper slot 444 of the dual-slot die. Accordingly, the first slurry 402 may be applied to form the lower active material layer, and the second slurry 404 may be applied to form the upper active material layer.

As each of the ejection proportion of the first slurry 402 and the ejection proportion of the second slurry 404 varies, the thickness of each of the first slurry 402 and the second slurry 404 coated on the current collector 452 may vary in the longitudinal direction of the current collector 452. The portion where the thickness of the first slurry with a relatively higher binder content is dominant may enhance the interfacial adhesion, while the portion where the thickness of the second slurry with a relatively lower binder content is dominant may allow for ease of penetration of lithium ions, leading to improved fast charging performance. As a result, enhanced interfacial adhesion and improved fast charging performance may be concurrently achieved.

The dryer 460 may dry the coated first slurry 402 and the coated second slurry 404. The dried first slurry and the dried second slurry may form the first active material layer and the second active material layer, respectively. In an embodiment, a pressing process may be further performed after the drying process.

As described above, by varying the ejection ratio over time or the coating length, it may be possible to manufacture an electrode that concurrently achieves improvement in the interfacial adhesion and the fast charging performance using typical dual coating equipment without the need for additional equipment.

The electrode may be manufactured by the above-described processes, and the manufactured electrode may be included in a secondary battery as either a negative electrode or a positive electrode.

Figure 5:
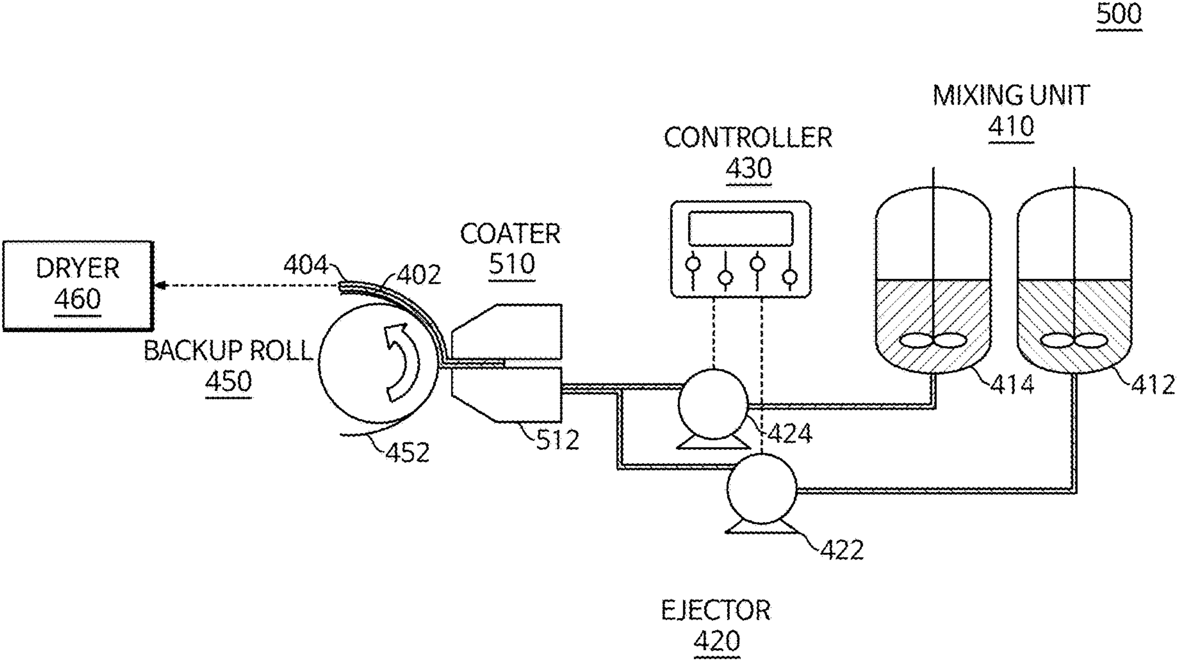
FIG. 5 is a schematic diagram illustrating an example of an electrode manufacturing apparatus according to another embodiment of the present disclosure.

FIG. 5 is a schematic diagram illustrating an example of an electrode manufacturing apparatus 500 according to another embodiment of the present disclosure.

Referring to FIG. 5, a coater 510 of the electrode manufacturing apparatus 500 may include a single-slot die including a single slot 512. Otherwise, the electrode manufacturing apparatus 500 illustrated in FIG. 5 may be the same or substantially the same as (or similar to) the electrode manufacturing apparatus 400 described above with reference to FIG. 4, and thus, redundant description may not be repeated and the differences therebetween may be mainly described in more detail hereinafter.

The coater 510 may apply the first slurry 402 and the second slurry 404 ejected at a variable ejection ratio onto the current collector 452 in the longitudinal direction of the current collector 452. The coater 510 may apply the first slurry 402 and the second slurry 404 onto the current collector 452 fed by the backup roll 450 in the longitudinal direction of the current collector 452. In the coating process, the first slurry 402 may be coated on a top surface of the current collector 452, and the second slurry 404 may be coated on a top surface of the first slurry 402.

In an embodiment, the coater 510 may include the single-slot die including the single slot 512. For example, the first slurry ejected by the first pump 422 and the second slurry ejected by the second pump 424 may be merged with each other in one pipeline. The merged first slurry and second slurry may be injected into the single slot 512 of the single-slot die through the same pipeline as each other. Accordingly, the first slurry 402 and the second slurry 404 may be coated onto the current collector 452 concurrently or substantially simultaneously with each other through the single slot 512.

Figure 6:
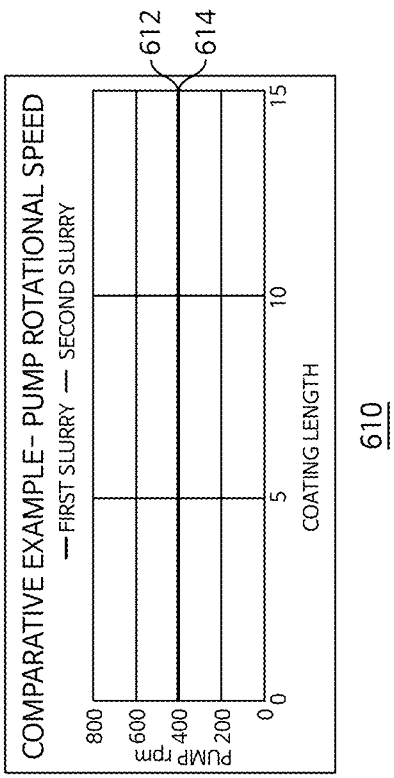
FIG. 6 illustrates graphs of examples of pump rotational speeds and slurry thicknesses according to an embodiment of the present disclosure.
Figure 6:
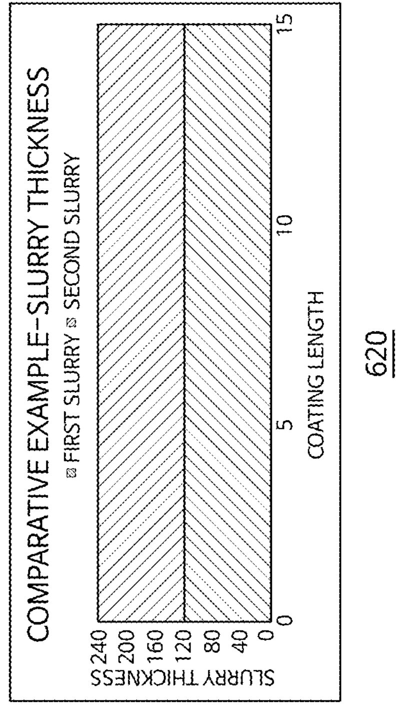
Figure 6:
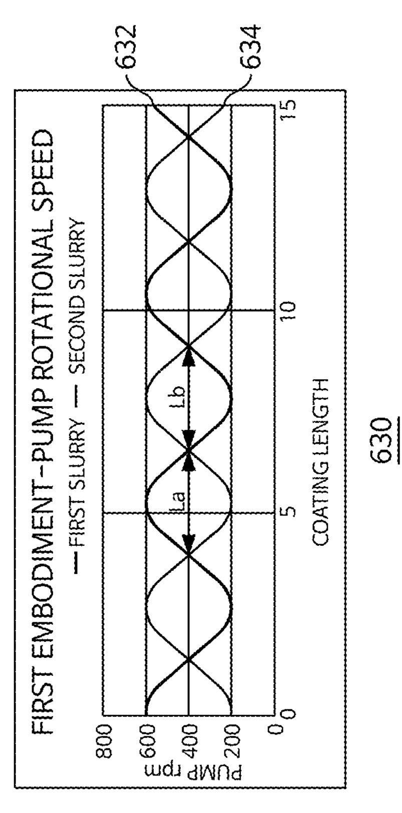
Figure 6:
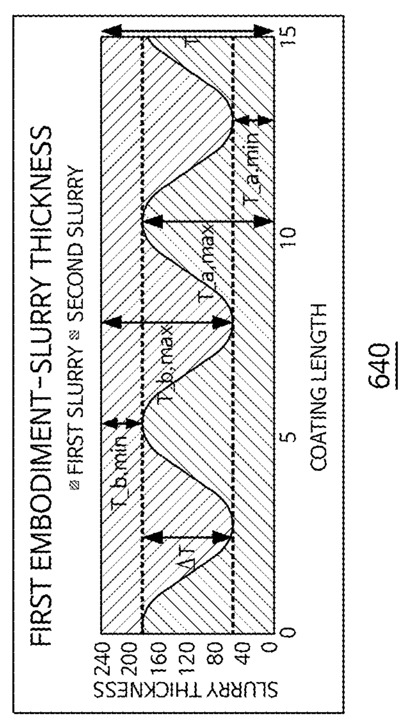

FIG. 6 illustrates graphs of examples of pump rotational speeds and slurry thicknesses according to an embodiment of the present disclosure.

Referring to FIG. 6, a first example 610 and a second example 620 illustrate an example of a pump rotational speed and a slurry thickness, respectively, according to a comparative case, and a third example 630 and a fourth example 640 illustrate an example of a pump rotational speed and a slurry thickness, respectively, according to an embodiment of the present disclosure. In the first through fourth examples 610, 620, 630, and 640, a first slurry is ejected by a first pump to form a lower active material layer, and a second slurry is ejected by a second pump to form an upper active material layer.

Referring to the first example 610 showing the example of the pump rotational speed according to the comparative case, the revolutions per minute (rpm) 612 of the first pump for ejecting the first slurry and the rpm 614 of the second pump for ejecting the second slurry are constant and do not fluctuate. Accordingly, the thickness of both of the first slurry and the second slurry may remain constant without varying with the coating length, as shown in the second example 620.

With the increasing prevalence of large cells with very high energy density, the comparative case shown in the first example 610 and the second example 620 may encounter limitations in the diffusion of lithium ions to the interior of the electrode during fast charging.

Referring to the third example 630 showing the example of the pump rotational speed according to an embodiment of the present disclosure, the rpm 632 of the first pump for ejecting the first slurry and the rpm 634 of the second pump for ejecting the second slurry may fluctuate in a wave-like manner along the length of the coating. In more detail, as shown in the third example 630, as the rpm 632 of the first pump for ejecting the first slurry increases, the rpm 634 of the second pump for ejecting the second slurry decreases. Similarly, as the rpm 632 of the first pump for ejecting the first slurry decreases, the rpm 634 of the second pump for ejecting the second slurry increases.

Accordingly, as shown in the fourth example 640, the thickness of the first slurry and the thickness of the second slurry may vary in a wave-like manner along the coating lengths of the first slurry and the second slurry, respectively, while the total thickness of the first slurry and the second slurry is maintained to be constant or substantially constant. Thus, the interface between the first slurry and the second slurry may form or approximately form a wave shape along the coating length.

According to an embodiment of the present disclosure, as shown in the third example 630 and the fourth example 640, the interfacial adhesion may be enhanced by a portion where the thickness of the first slurry having a high binder content is dominant (e.g., the portion at which the thickness of the first slurry is greater than the thickness of the second slurry), and lithium ions may be easily penetrated by a portion where the thickness of the second slurry having a lower binder content is dominant (e.g., the portion at which the thickness of the second slurry is greater than the thickness of the first slurry), thereby, improving fast charging performance. Consequently, enhanced interfacial adhesion and improved fast charging performance can be concurrently achieved.

Figure 7:
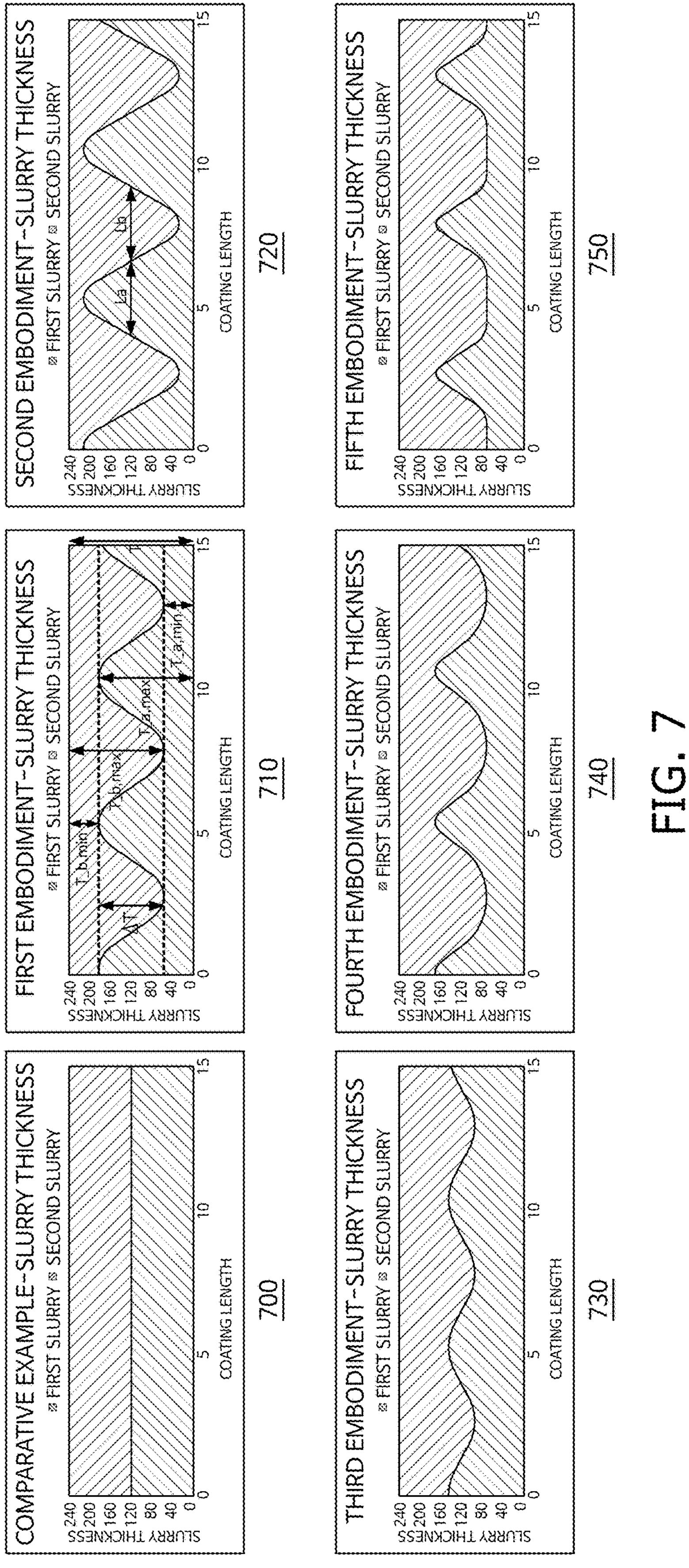
FIG. 7 illustrates graphs of examples of slurry thicknesses according to one or more embodiments of the present disclosure.

FIG. 7 illustrates graphs of examples of slurry thicknesses according to one or more embodiments of the present disclosure.

The form and shape of the two active material layers included in the electrode of one or more embodiments of the present disclosure may be implemented with various design modifications. For example, FIG. 7 shows some examples of slurry thicknesses that may be obtained by varying design parameters as shown in Table 1 below.

TABLE 1

| | Pump rotational speed | | Length (cm) | | | Thickness (μm) | | |
|---|---|---|---|---|---|---|---|---|
| | Ra | Rb | La | Lb | Ratio | Ta | Tb | ΔT |
| Comparative example (700) | 400 | 400 | — | — | — | 120 | 120 | 0 |
| First example (710) | 200~600 | 600~200 | 2.625 | 2.625 | 1:1 | 60~180 | 180~60 | 120 |
| Second example (720) | 80~720 | 720~80 | 2.625 | 2.625 | 1:1 | 24~216 | 216~24 | 192 |
| Third example (730) | 320~480 | 480~320 | 2.625 | 2.625 | 1:1 | 96~144 | 144~96 | 48 |
| Fourth example (740) | 240~560 | 560~240 | 1.75 | 3.5 | 1:2 | 72~168 | 168~72 | 96 |
| Fifth example (750) | 240~560 | 560~240 | 1.5 | 3.75 | 1:2.5 | 72~168 | 168~72 | 96 |

Referring to Table 1, Ra and Rb indicate the rotational speed (rpm) of the first pump for ejecting the first slurry and the rotational speed (rpm) of the second pump for ejecting the second slurry, respectively. La and Lb indicate the length of the region where the thickness of the first slurry is dominant and the length of the region where the thickness of the second slurry is dominant, respectively. Ta and Tb indicate the thickness of the first slurry and the thickness of the second slurry, respectively. AT indicates the sum of the thickness of the first slurry and the second slurry.

By varying the design parameters, the thickness of the first slurry and the thickness of the second slurry along the length of the coating may be appropriately varied depending on the desired objectives, such as improving the interfacial adhesion and/or improving the fast charging performance.

Figure 8:
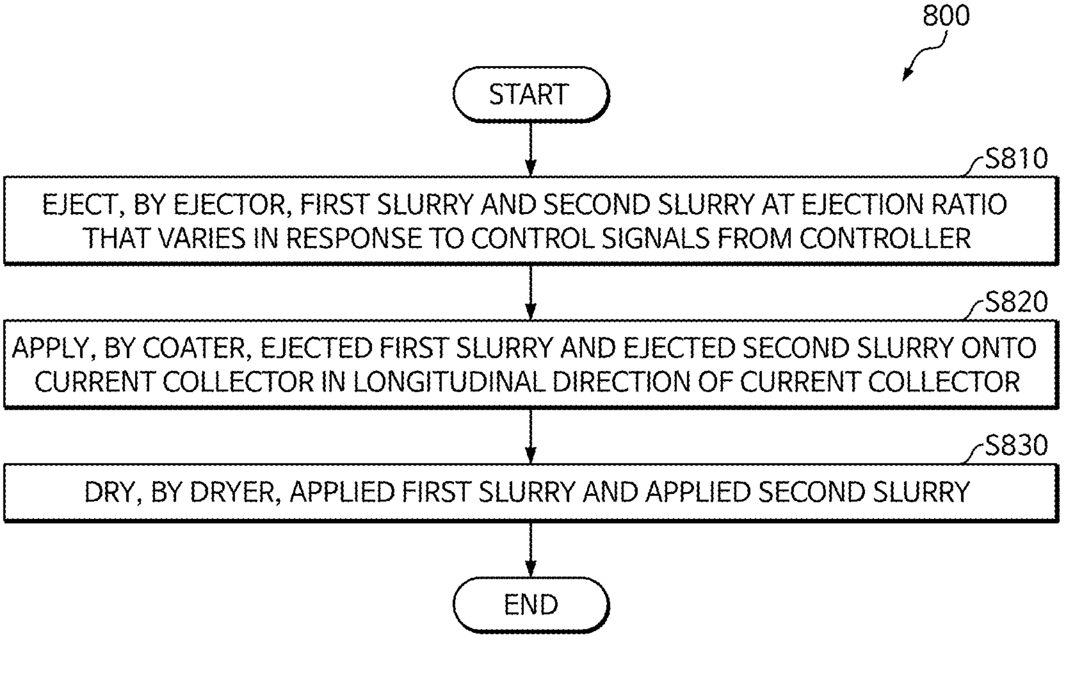
FIG. 8 is a flowchart illustrating an example of a method for manufacturing an electrode of a secondary battery according to an embodiment of the present disclosure.

FIG. 8 is a flowchart illustrating an example of a method 800 for manufacturing an electrode of a secondary battery according to an embodiment of the present disclosure. For example, the method 800 may be performed by the electrode manufacturing apparatus described above according to one or more embodiments of the present disclosure, but the present disclosure is not limited thereto, and the method 800 may be performed by any suitable apparatus or device as would be understood by those having ordinary skill in the art.

Referring to FIG. 8, the method 800 may start, and the ejector may eject the first slurry and the second slurry at an ejection ratio that varies in response to control signals from the controller (e.g., block S810). For example, the controller may control the ejector so that the ejection ratio of the first slurry to the second slurry varies, while the sum of the ejection amount of the first slurry and the ejection amount of the second slurry remains constant or substantially constant. The ejector may eject the first slurry and the second slurry in response to the control signals from the controller, while maintaining or substantially maintaining a constant sum of the ejection amount of the first slurry and the ejection amount of the second slurry, and may allow the ejection ratio of the first slurry to the second slurry to be changed. In more detail, the controller may control the ejector so that each of the ejection proportion of the first slurry and the ejection proportion of the second slurry over time or the coating length varies in a wave-like manner (e.g., the ejection ratio of the first slurry to the second slurry over time or the coating length varies in a wave-like manner). In response to control signals from the controller, the ejector may eject the first slurry and the second slurry so that each of the ejection proportion of the first slurry and the ejection proportion of the second slurry over time or the coating length varies in a wave-like manner.

In an embodiment, the ejector may include a first pump and a second pump. In this case, the first pump may eject the first slurry while rotating at a rotational speed that varies in response to control signals from the controller, and the second pump may eject the second slurry while rotating at a rotational speed that varies in response to control signals from the controller. For example, in response to the control signals from the controller, the rotational speed of each of the first pump and the second pump over time or the coating length may vary in a wave-like manner. In more detail, the controller may control the ejector so that the rotational speed of each of the first pump and the second pump over time or along the coating length fluctuates in a wave-like manner in a range, for example, from ±20% to ±80% on the basis of a central value of the rotational speed. In response to the control signals from the controller, the elapsed time-based rotational speed or the coating length-based rotational speed of each of the first pump and the second pump may vary in a wave-like manner in the range from ±20% to ±80% with respect to the central value of the rotational speed.

The coater may apply the first slurry and the second slurry ejected at a variable ejection ratio onto the current collector in the longitudinal direction of the current collector (e.g., block S820). For example, the backup roll may rotate and feed the current collector to the coater, such that the current collector passes through the coater in the longitudinal direction thereof. The coater may apply the first slurry and the second slurry onto the current collector fed by the backup roll in the longitudinal direction of the current collector. In the coating process, the first slurry may be coated on a top surface of the current collector, and the second slurry 404 may be coated on a top surface of the first slurry.

In an embodiment, the coater may include a dual-slot die including an upper slot and a lower slot. In this case, the first slurry may be applied through the lower slot of the dual-slot die, and the second slurry may be applied through the upper slot of the dual-slot die. In another embodiment, the coater may include a slot die having a single slot. In this case, the first slurry and the second slurry may be applied onto the current collector concurrently or substantially simultaneously with each other through the single slot of the slot die.

In an embodiment, as the ejection proportion of the first slurry and the ejection proportion of the second slurry vary, the thicknesses of the first slurry and the second slurry coated to the current collector may vary in the longitudinal direction of the current collector. The binder content of the first slurry may be higher than the binder content of the second slurry. The portion where the thickness of the first slurry with a relatively higher binder content is dominant may enhance the interfacial adhesion, while the portion where the thickness of the second slurry with a relatively lower binder content is dominant may allow for ease of penetration of lithium ions, leading to improved fast charging performance.

The dryer may dry the coated first slurry and the coated second slurry (e.g., block S830), and the method 800 may end.

The electrode manufactured by the above-described processes of the method 800 may be included in a secondary battery as either a negative electrode or a positive electrode.

The flowchart and the above-described processes of the method 800 of FIG. 8 are provided as an example, and thus, the present disclosure is not limited thereto. For example, one or more of the processes (e.g., blocks) in the flowchart of the method 800 may be added, altered, and/or deleted, the sequence of one or more of the processes may be changed, and/or two or more of the processes may be performed concurrently or substantially simultaneously with each other.

As the positive electrode active material, a compound capable of reversibly intercalating/deintercalating lithium (e.g., a lithiated intercalation compound) may be used. For example, at least one of a composite oxide of lithium and/or a metal selected from cobalt, manganese, nickel, and/or suitable combinations thereof may be used.

The composite oxide may be a lithium transition metal composite oxide, and examples thereof may include a lithium nickel-based oxide, a lithium cobalt-based oxide, a lithium manganese-based oxide, a lithium iron phosphate-based compound, a cobalt-free nickel-manganese-based oxide, or a suitable combination thereof.

As an example, a compound represented by any one of the following formulas may be used: LiaA1-bXbO2-cDc (0.90≤a≤1.8, 0≤b≤0.5, 0≤c≤0.05); LiaMn2-bXbO4-cDc (0.90≤a≤1.8, 0≤b≤0.5, 0≤c≤0.05); LiaNi1-b-cCobXcO2-αDα (0.90≤a≤1.8, 0≤b≤0.5, 0≤c≤0.5, 0<α<2); LiaNi1-b-cMnbXcO2-αDα (0.90≤a≤1.8, 0≤b≤0.5, 0≤c≤0.5, 0<α<2); LiaNibCocL1dGeO2 (0.90<a≤1.8, 0≤b≤0.9, 0≤c≤0.5, 0≤d≤0.5, 0≤e≤0.1); LiaNiGbO2 (0.90≤a≤1.8, 0.001≤b≤0.1); LiaCoGbO2 (0.90≤a≤1.8, 0.001≤b≤0.1); LiaMn1-bGb02 (0.90≤a≤1.8, 0.001≤b≤0.1); LiaMn2GbO4 (0.90≤a≤1.8, 0.001≤b≤0.1); LiaMn1-gGgPO4 (0.90≤a≤1.8, 0≤g≤0.5); Li(3−f)Fe2(PO4)3 (0≤f≤2); and LiaFePO4 (0.90≤a≤1.8).

In the above formulas: A is Ni, Co, Mn, or a suitable combination thereof; X is Al, Ni, Co, Mn, Cr, Fe, Mg, Sr, V, a rare earth element, or a suitable combination thereof; D is O, F, S, P, or a suitable combination thereof; G is Al, Cr, Mn, Fe, Mg, La, Ce, Sr, V, or a suitable combination thereof; and L1 is Mn, Al, or a suitable combination thereof.

A positive electrode for a lithium secondary battery may include a current collector, and a positive electrode active material layer formed on the current collector. The positive electrode active material layer may include a positive electrode active material, and may further include a binder and/or a conductive material.

The content of the positive electrode active material may be in a range, for example, of about 90 wt % to about 99.5 wt % on the basis of 100 wt % of the positive electrode active material layer. The content of the binder and/or the conductive material may be in a range of about 0.5 wt % to about 5 wt %, respectively, on the basis of 100 wt % of the positive electrode active material layer.

The current collector may include (e.g., may be) aluminum (Al) but the present disclosure is not limited thereto.

The negative electrode active material may include a material capable of reversibly intercalating/deintercalating lithium ions, a lithium metal, an alloy of the lithium metal, a material capable of being doped and undoped with lithium, or a transition metal oxide.

The material capable of reversibly intercalating/deintercalating lithium ions may be a carbon-based negative electrode active material, which may include, for example, crystalline carbon, amorphous carbon, or a suitable combination thereof. Examples of the crystalline carbon may include graphite, such as natural graphite or artificial graphite, and examples of the amorphous carbon may include soft carbon, hard carbon, a pitch carbide, a meso-phase pitch carbide, sintered coke, and the like.

A Si-based negative electrode active material or a Sn-based negative electrode active material may be used as the material capable of being doped and undoped with lithium. The Si-based negative electrode active material may be silicon, a silicon-carbon composite, SiOx (0<x<2), a Si-based alloy, or a suitable combination thereof.

The silicon-carbon composite may be a composite of silicon and amorphous carbon. According to an embodiment, the silicon-carbon composite may be in the form of a silicon particle, and amorphous carbon coated on the surface of the silicon particle.

The silicon-carbon composite may further include crystalline carbon. For example, the silicon-carbon composite may include a core including crystalline carbon and a silicon particle, and an amorphous carbon coating layer on the surface of the core.

A negative electrode for a lithium secondary battery may include a current collector, and a negative electrode active material layer disposed on the current collector. The negative electrode active material layer may include a negative electrode active material, and may further include a binder and/or a conductive material.

For example, the negative electrode active material layer may include about 90 wt % to about 99 wt % of the negative electrode active material, about 0.5 wt % to about 5 wt % of the binder, and about 0 wt % to about 5 wt % of the conductive material.

A non-aqueous binder, an aqueous binder, a dry binder, or a suitable combination thereof may be used as the binder. When the aqueous binder is used as the negative electrode binder, a cellulose-based compound capable of imparting viscosity may be further included.

As the negative electrode current collector, one selected from copper foil, nickel foil, stainless steel foil, titanium foil, nickel foam, copper foam, conductive metal-coated polymer substrate, and/or a suitable combination thereof may be used.

An electrolyte for a lithium secondary battery may include a non-aqueous organic solvent and a lithium salt.

The non-aqueous organic solvent acts as a medium through which ions involved in the electrochemical reaction of the battery can move.

The non-aqueous organic solvent may be a carbonate-based solvent, an ester-based solvent, an ether-based solvent, a ketone-based solvent, an alcohol-based solvent, or an aprotic solvent, and may be used alone or in a suitable combination of two or more.

In addition, when a carbonate-based solvent is used, a mixture of cyclic carbonate and chain carbonate may be used.

Depending on the kind of lithium secondary battery, a separator may be present between the first electrode plate (e.g., the negative electrode) and the second electrode plate (e.g., the positive electrode). As the separator, polyethylene, polypropylene, polyvinylidene fluoride, or a multilayered film of two or more layers thereof may be used.

The separator may include a porous substrate, and a coating layer including an organic material, an inorganic material, or a suitable combination thereof on one or both surfaces of the porous substrate.

The organic material may include a polyvinylidene fluoride-based heavy antibody or a (meth)acrylic polymer.

The inorganic material may include inorganic particles selected from among Al2O3, SiO2, TiO2, SnO2, $CeO_2$, MgO, NiO, CaO, GaO, ZnO, ZrO2, $Y_2O_3$, SrTiO3, BaTiO3, Mg(OH)2, boehmite, and/or a suitable combination thereof, but the present disclosure is not limited thereto.

The organic material and the inorganic material may be mixed in one coating layer, or may be in the form of a coating layer containing an organic material and a coating layer containing an inorganic material that are laminated on each other.

The electronic or electric devices and/or any other relevant devices or components according to embodiments of the present disclosure described herein (e.g., the controller) may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

DESCRIPTION OF SOME REFERENCE SYMBOLS

100: secondary battery
110: second electrode
120: first electrode
130: separator
140: case
150: cap assembly

What is claimed is:

1. A method for manufacturing an electrode for a secondary battery, the method comprising:
- ejecting, by an ejector, a first slurry and a second slurry at a variable ejection ratio that varies in response to control signals from a controller;
- coating, by a coater, the first slurry and the second slurry ejected at the variable ejection ratio onto a current collector in a longitudinal direction of the current collector; and
- drying, by a dryer, the first slurry and the second slurry coated onto the current collector,
- wherein thicknesses of the first slurry and the second slurry that are coated onto the current collector vary along a longitudinal direction of the current collector, as the variable ejection ratio of the first slurry to the second slurry varies.

2. The method as claimed in claim 1, wherein the ejector comprises a first pump and a second pump, and
- wherein to eject the first slurry and the second slurry, the method comprises:
  - ejecting, by the first pump, the first slurry while rotating at a rotational speed that varies in response to control signals from the controller; and
  - ejecting, by the second pump, the second slurry while rotating at a rotational speed that varies in response to control signals from the controller.

3. The method as claimed in claim 2, wherein in the ejecting of the first slurry and the second slurry, each of a rotational speed of the first pump and a rotational speed of the second pump over time or over a coating length varies in a wave-like manner in response to the control signals from the controller.

4. The method as claimed in claim 3, wherein in the ejecting of the first slurry and the second slurry, each of the rotational speed of the first pump and the rotational speed of the second pump over the time or over the coating length varies in a range from ±20% to ±80% based on a central value of the rotational speed.

5. The method as claimed in claim 1, wherein the coater comprises a dual-slot die including an upper slot and a lower slot, and wherein to coat the first slurry and the second slurry, the method comprises:

applying the first slurry onto the current collector through the lower slot of the dual-slot die; and applying the second slurry onto the current collector through the upper slot of the dual-slot die.

6. The method as claimed in claim 1, wherein the coater comprises a slot die including a single slot, and wherein to coat the first slurry and the second slurry, the method comprises applying the first slurry and the second slurry concurrently onto the current collector through the single slot of the slot die.

7. The method as claimed in claim 1, wherein in the ejecting of the first slurry and the second slurry, the variable ejection ratio of the first slurry to the second slurry varies, while a sum of an ejection amount of the first slurry and an ejection amount of the second slurry remains constant, in response to the control signals from the controller.

8. The method as claimed in claim 1, wherein to coat the first slurry and the second slurry, the method comprises:

coating the first slurry on a top surface of the current collector; and coating the second slurry on a top surface of the first slurry.

9. The method as claimed in claim 8, wherein a binder content of the first slurry is higher than a binder content of the second slurry.

10. The method as claimed in claim 1, further comprising feeding, by a backup roll, the current collector to the coater.

11. A method for manufacturing an electrode for a secondary battery, the method comprising:

ejecting, by an ejector, a first slurry and a second slurry at a variable ejection ratio that varies in response to control signals from a controller;

coating, by a coater, the first slurry and the second slurry ejected at the variable ejection ratio onto a current collector in a longitudinal direction of the current collector; and drying, by a dryer, the first slurry and the second slurry coated onto the current collector wherein in the ejecting of the first slurry and the second slurry, the variable ejection ratio of the first slurry to the second slurry over time or over a coating length varies in a wave-like manner in response to the control signals from the controller.

* * * * *